June 27, 1933.   J. R. BRANT   1,915,847
METHOD OF FASTENING A VALVE FITTING TO A CABLE
Filed June 27, 1931
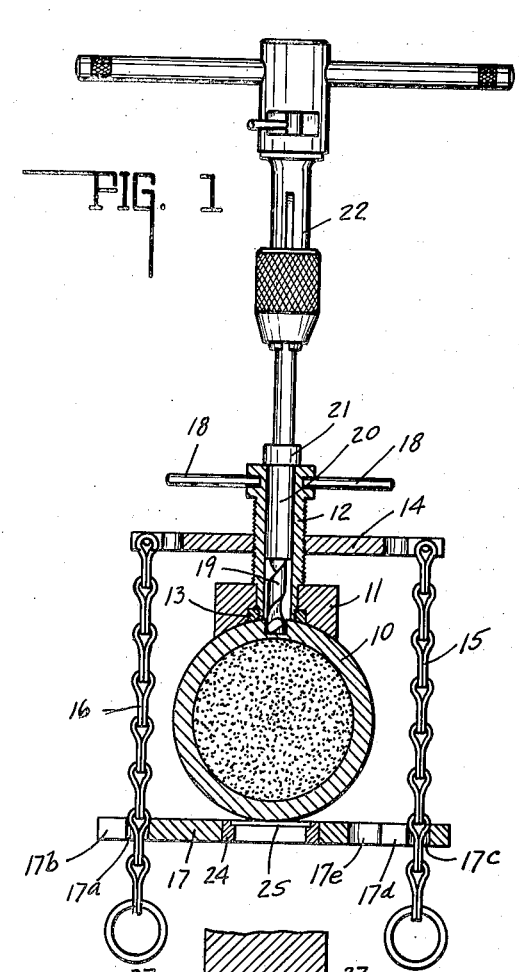
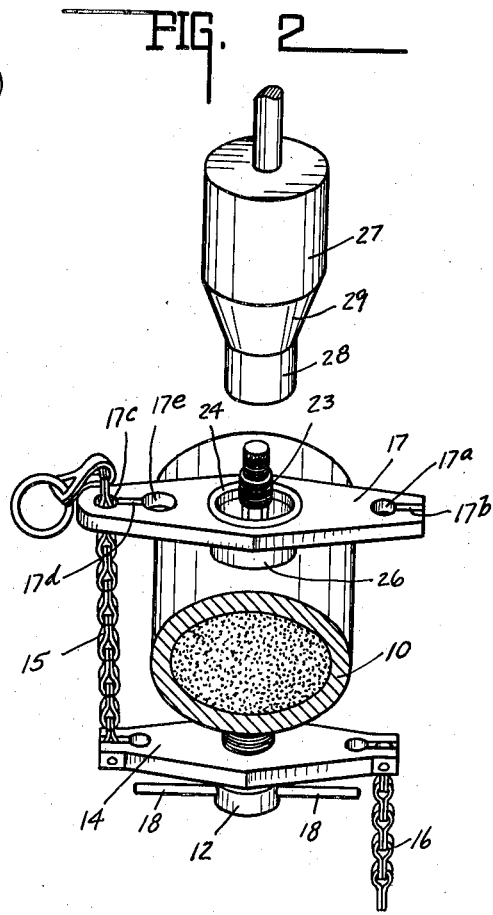
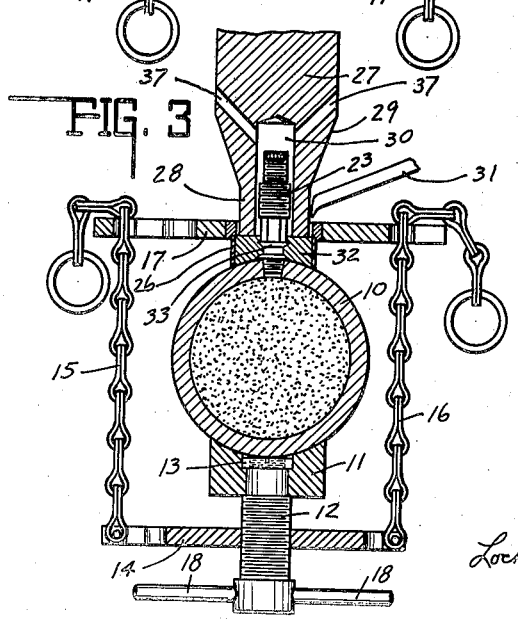
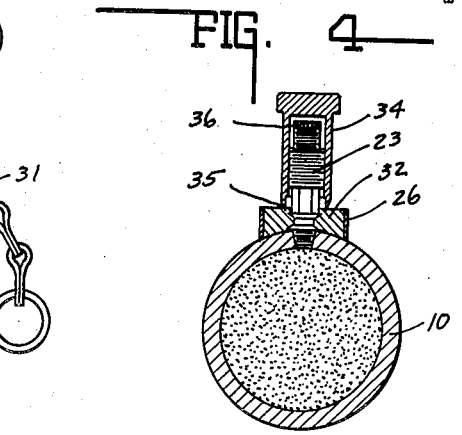
INVENTOR.
JOHN R. BRANT.
BY Lockwood Lockwood Goldsmith & Galt
ATTORNEYS.

Patented June 27, 1933

1,915,847

UNITED STATES PATENT OFFICE

JOHN R. BRANT, OF INDIANAPOLIS, INDIANA

METHOD OF FASTENING A VALVE FITTING TO A CABLE

Application filed June 27, 1931. Serial No. 547,250.

This invention relates to a method and means for fastening a valve fitting to a sheathed cable. It is particularly useful in preparing a sheathed telephone cable for "gassing".

It is common practice in the maintenance of telephone cables to introduce an inert gas into the cable under sufficient pressure to expel all moisture and to prevent the entrance of moisture through small breaks which may occur in the sheath of the cable. In this work, it is advantageous to have valve fittings permanently installed in the cable through which the said gas may be introduced and to which pressure gauges may be applied to test the pressure within the cable. Such fittings must necessarily be installed in the field since it is impossible to predetermine the exact point at which a fitting will be required and since it is impractical to transport and install cables having the fittings attached thereto.

The object of the present invention is to provide a method and apparatus by means of which such fittings may be expeditiously attached in the field.

The subject matter of the present invention constitutes an improvement over that shown in co-pending applications, Serial Nos. 490,875 and 490,876, both filed October 24, 1930.

The full nature of the invention will be understood from the accompanying drawing and the following description and claim:

Figure 1 is a sectional view through a telephone cable and apparatus used for drilling a hole through the sheath thereof preparatory to inserting the fitting. Figure 2 is a perspective view showing the method of locating and clamping a ferrule about the lower portion of the valve fitting after the same has been screwed into the hole formed by the apparatus of Figure 1. Figure 3 is a sectional view illustrating the apparatus for clamping the ferrule in place and the means used for filling the ferrule with solder or other fusible material to anchor the fitting in place. Figure 4 is a sectional view showing the fitting completely assembled and anchored and illustrating a form of cap used for sealing the fitting to prevent escape of gas therefrom when not in use.

In the drawing, there is shown a telephone cable having the usual form of lead sheath 10. In drilling the hole for the fitting, a block 11 having a surface sustantially fitting the curvature of the cable is placed thereon at the position where it is desired to place the hole. The block 11 has a threaded bushing 12 rotatably fastened thereto by means of a collar 13. An elongated plate 14 is threadedly engaged with the external threads of the bushing 12 and has attached thereto a pair of chains 15 and 16. The chain 15 is shown in Figure 1 passing through an opening 17c in an elongated plate 17. The said opening is so small that the links of the chain 15 cannot be pulled therethrough but the said chain may be slipped through an elongated slot 17d into a larger opening 17e through which it may be pulled. Any desired link, to obtain proper adjustment, may then be slipped through the slot 17d into the opening 17c. The chain 16 is shown in Figure 1 passing through an opening 17a in the plate 17. The opening 17a is likewise too small for the chain to be drawn therethrough but any desired link may be inserted through a slot 17b. The plate 17 engages the lower surface of the cable sheath 10. With the parts in this position, the bushing 12 is rotated by means of handles 18 and the chains 15 and 16 are thereby tightened to press the block 11 securely against the cable sheath.

The bushing 12 has a central opening through which a drill 19 may be inserted. The drill 19 is formed with an enlarged portion 20 substantially fitting the central opening in bushing 12 and also carries a collar 21 adapted to engage the upper surface of the bushing 12 when the lower end of the drill 19 has cut substantially through the cable sheath 10. The drill may be turned by a common form of ratchet handle 22 fitted to the upper end. By this means, the hole is drilled through the cable sheath without permitting the drill to damage the conductors and insulation material within the sheath.

After the hole has been drilled, a valve fitting 23 is screwed therein, as best shown in Figure 3. The said valve fitting is of the common type used for automobile tires and carries an internal valve permitting the entrance of gas to the cable but preventing the exit of gas therefrom. The plate 17 which forms a part of the clamping apparatus heretofore described, has fitted therein a bushing 24 of aluminum or other material to which solder will not adhere. The said bushing is formed with a central opening having a counterbored recess 25 therein. When the fitting has been put in place, the said clamping apparatus is reversed, as shown in Figure 2, and the recess 25 is engaged with the upper edge of a ferrule 26 which is placed about the fitting 23. With the parts in this position, the block 11 engages the undersurface of the cable instead of the upper surface. A centering tool 27, having a portion 28 of slightly less diameter than the internal diameters of the bushing 24 and ferrule 26 and having a central cavity 30 substantially fitting the valve fitting 23, is then placed over the valve fitting and within the ferrule and bushing. The tool 27 is formed with a tapering portion 29 adapted to engage the upper edge of the bushing 24 and thus accurately centers the bushing and ferrule about the fitting 23. With the centering tool in place, the proper link of chain 16 is slipped through the slot 17b into the opening 17a. The handles 18 are then revolved to clamp the ferrule 26 securely against the upper surface of the cable 10.

The centering tool 27 is preferably used also as a soldering tool in the manner shown in Figure 3. However, if desired, a separate tool may be used for centering and for soldering. After the ferrule 26 has been clamped in place, the soldering tool is heated and is placed over the fitting 23 and within the ferrule 26. The outer diameter of the portion 28 of the said tool is smaller than the inner diameter of the bushing 24 and ferrule 26 by an amount sufficient to permit fusible material, such as solder, to flow into the ferrule 26. With the parts in this position, a stick or wire 31 of such fusible material is brought against the side of the heated soldering tool and the said material is melted thereby and flows into the ferrule 26. As the fusible material fills the ferrule, the tool 27 is gradually withdrawn until the ferrule is substantially filled, as shown at 32 in Figure 3. The fitting 23 is provided with an anchorage portion 33 substantially as described in the before-mentioned co-pending applications and this anchorage, when imbedded in the fusible material 32, assists greatly in making the anchorage secure.

When the ferrule 26 has been filled, the soldering tool and clamping mechanism are removed and a cap 34 is then fitted over the fitting 23. The said cap has internal threads engaging external threads on the fitting and has a sharpened lower edge 35 adapted to cut into the upper surface of the fusible material 32 and thus provide an additional seal against the escape of gas. It will be seen that the lower portion 28 of the soldering tool is substantially flat. It thus serves to preserve a substantially flat upper surface of the soldering material 32 so that the sharpened edge 35 of the cap 34 may engage said surface equally about its entire circumference. The fitting 23 is also supplied with an auxiliary cap 36 engaging internal threads therein as described in my co-pending applications and the said cap serves as a further seal to prevent escape of gas. The tool 27 is provided with openings 37 communicating with its central cavity 30 to prevent escape of heated air or other gases formed in the soldering operation. Without such passages, the said gas tends to boil out through the fusible material and thus destroys the smoothness of the upper surface and the uniformity of the filling.

It will be seen that a method and means are thus provided for anchoring the valve fitting which insure that the same may be carried out rapidly and expeditiously in the field and insure that a strong, permanent and gas-tight assembly is produced. The apparatus involved is of a relatively light construction and may be easily transported without adding great weight to the electrician's tool kit.

The invention claimed is:

A method of fastening a valve fitting to a sheathed cable, including the steps of drilling a hole through the sheath of said cable, inserting the valve fitting therein, clamping a ferrule against said sheath in position to surround the lower portion of said fitting, covering said fitting with a heated soldering tool extending into said ferrule and slightly spaced from the inside surface of said ferrule, applying a fusible material to the side of said tool for melting the same to permit the said material to flow into said ferrule, and gradually withdrawing said soldering tool as the ferrule fills with said material.

In witness whereof, I have hereunto affixed my signature.

JOHN R. BRANT.